June 24, 1941. B. J. INGRAM 2,246,800
LIQUID LEVEL CONTROL APPARATUS
Filed Oct. 17, 1939
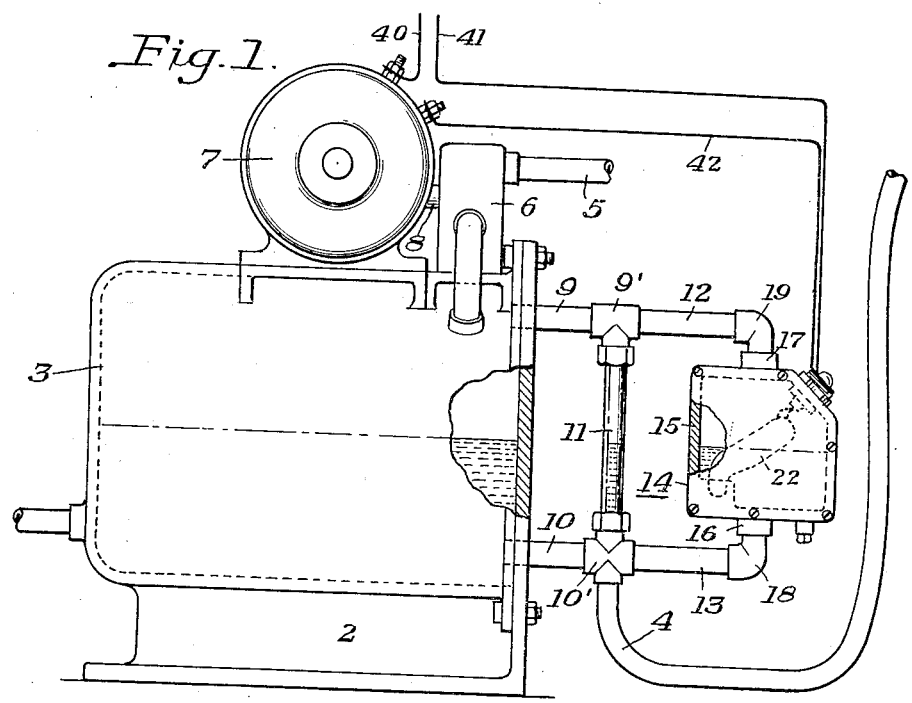
Fig. 1.
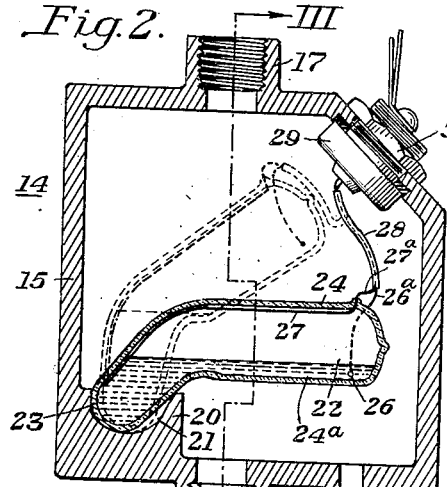
Fig. 2.
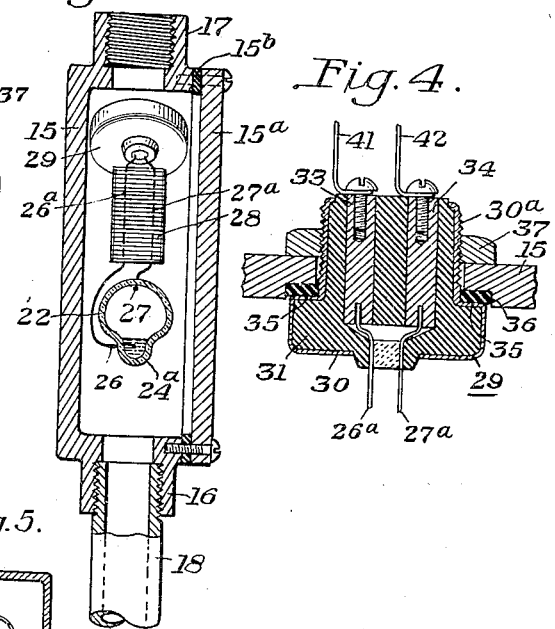
Fig. 3.
Fig. 4.
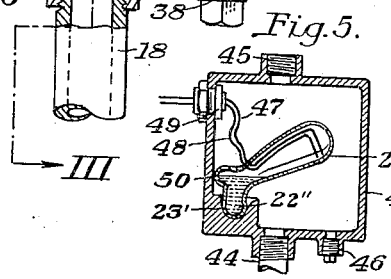
Fig. 5.
INVENTOR
Bernard J. Ingram
by his attorneys Patented June 24, 1941

2,246,800

UNITED STATES PATENT OFFICE 2,246,800

LIQUID LEVEL CONTROL APPARATUS

Bernard J. Ingram, Bellevue, Pa., assignor of one-half to E. H. Haupt, Bethel Township, Pa.

Application October 17, 1939, Serial No. 299,845

10 Claims. (Cl. 200—84)

This invention relates to liquid level control apparatus and is for an apparatus especially designed for use in operating an electric circuit to either turn on or off the supply of fluid to the chamber in which the liquid level is to be controlled, and the invention is particularly applicable to control of liquid levels in apparatus wherein liquid may be under pressure as for example in beverage carbonators and where usual types of float valves cannot be conveniently employed.

In beverage carbonators, for example, an electrically driven pump is provided for pumping water into the carbonator. Carbon dioxide under pressure is also supplied to the carbonator and it is desirable to maintain the level of the water in the carbonator between certain predetermined levels. The presence of the gas in the carbonator chamber keeps the water under considerable pressure. The pump and its driving motor is necessarily outside of the carbonating chamber in which the liquid is contained. Usual types of float-operated switches or valves cannot be conveniently employed because in such mechanisms the float in the liquid chamber must transmit motion to a valve or switch located outside the liquid chamber. This would require the use of a packing gland around the shaft through which motion may be transmitted from the inside of the chamber to the device on the outside. Any gland that successfully seals the shaft against leakage of gas or water thereabout would exert considerable friction on the shaft so that the float would be unreliable. Consequently in carbonators or like devices it is customary to control the liquid level in the carbonating chamber by means of a tank which is connected to the carbonator through two flexible hoses, one hose communicating to the carbonator below the liquid level and one hose connecting to the carbonating chamber above the liquid level. This tank is suspended from a lever mechanism not unlike a weighing scale so that when a predetermined weight of water flows into the tank, corresponding to a predetermined level of liquid in the carbonator, the tank, by reason of the weight of water and its manner of suspension from the levers, tilts the lever mechanism from which it is suspended. The movement of this lever mechanism in turn operates a switch which cuts off the electric current to the motor that pumps water into the carbonator. When a predetermined amount of water has been drawn out of the carbonator causing the liquid level to drop and causing a corresponding drop in the liquid level in the control tank, the lever system overbalances the weight of the control tank and moves in the reverse direction to close the circuit to the electric motor and thereby causes the pump to operate. This mechanism is not only intricate and expensive but it is also quite bulky and its provision on the carbonator requires that the carbonator occupy considerably more floor space than would be required if such a bulky mechanism were not needed. Moreover, the rubber hoses through which the control tank is connected to the carbonator are a source of frequent trouble. They have to be replaced from time to time, they are very likely to develop leaks, or leaks are frequent where the hoses are connected into the metal parts. The hoses must be relatively long in order to have the necessary flexibility and care must be taken when the hoses are being connected that they are not twisted as a twist in the hose exerts a bias on the suspended tank tending to move it down or up, thereby destroying the accuracy of the liquid level control. Also, after the carbonators have been in use for a considerable time, scale-like deposits collect in the control tank adding permanent weight to the tank and this in turn causes the device to open the motor circuit before the desired predetermined liquid level has been reached in the carbonator.

The present invention provides a liquid level control which is peculiarly adaptable to use with carbonators and like devices in which liquid level has to be controlled and in which pressures other than atmospheric pressures are maintained and which, while being much more compact and responsive than either conventional float devices or suspended tank arrangements as previously described, eliminates the objections to both of said methods of control.

According to my invention the liquid level is controlled through the use of a buoyant mercury tube switch which is directly responsive to the variation in liquid level. When the liquid level drops to a given point, the buoyant mercury tube switch changes its position so that the mercury closes an electric circuit causing the pump or other device to admit liquid to the chamber whose level is to be controlled. As the liquid level rises, the mercury switch is buoyed up to a point where the mercury flows away from the contacts within the tube and opens the liquid level control circuit. The making and closing of the circuit occurs entirely within the sealed mercury tube so that there are no contacts that can be affected by the operation of the device nor by the fact that it is disposed in a liquid chamber. The circuit to the contacts of the mercury tube switch is made through flexible wires that do not impair the buoyancy of the switch. These wires are passed through the cell or casing in which the mercury tube switch is housed and it is an easy matter to seal these wires against leakage of water or gas. The device is much more compact than any conventional float or the suspended tank arrangement previously described and is much more positive, is not likely to be affected by accumulations of foreign material and does not require any attention over long periods of time. The mercury tube is preferably so supported in the casing in which it operates as to require no pivoting support other than its own base so that there are no parts to be affected by rust or corrosion.

My invention may be more readily understood by reference to the accompanying drawing which illustrates one preferred embodiment of my invention, but it will be understood that the invention is not restricted to the particular construction and arrangement of parts illustrated. In the drawing—

Figure 1 is a schematic view of a carbonator with a liquid level control device embodying my invention applied thereto;

Figure 2 is a longitudinal section through the liquid level control unit per se;

Figure 3 is a transverse section in substantially the plane of line III—III of Figure 2;

Figure 4 is a detailed sectional view showing one manner of providing the lead-in wires in the casing; and Figure 5 is a view similar to Figure 2 of a slightly modified arrangement, the view being on a smaller scale than Figure 2.

In the following description of my invention I will describe the same particularly in connection with a beverage carbonating device or a like apparatus, but it will be understood that this is for the purpose of illustration and that the invention is applicable to various systems and apparatus in which the maintenance of a liquid level between predetermined limits is desired. In the drawing 2 designates the base of a carbonator having a fluid-tight tank 3 with a water outlet pipe 4, a water inlet connection 5 and a pump 6 for forcing water into the tank 3 under pressure. In a carbonator there is of course a source of gas which has not been illustrated and which forms no part of the present invention, but by reason of this gas supply it is possible to maintain a pressure in the tank considerably above atmospheric pressure. The maintenance of such pressure is desired both for the purpose of causing the solution of carbon dioxide gas in the water to carbonate it and to prevent the gas from bubbling out of the water after it has been dissolved, as well as for forcing the water upwardly to the beverage dispenser which is usually located above the carbonator. The pump 6 is driven by a motor 7 usually through a reducing gear not shown, the driving shaft from the motor to the pump being shown at 8.

At one end of the tank 3 there are two pipe connectors or nipples 9 and 10, one of these nipples 10 being connected to the tank near the bottom thereof, the other nipple 9 opening into the tank adjacent the top of the tank. Secured to the nipples 9 and 10 are pipe fittings 9' and 10' respectively. A gauge glass 11 extends between the fittings 9' and 10' and serves to indicate the liquid level in the carbonator. The water outlet pipe 4 is illustrated as being connected to the fitting 10'.

In carbonators as heretofore constructed it has been the usual practice to have two flexible hoses connected to the fittings 9' and 10' which hoses in turn are connected to the liquid level control tank hereinbefore described. According to the present invention two pipes 12 and 13 are provided, one leading from the fitting 9' and one leading from the fitting 10' respectively and the liquid level control unit indicated generally as 14 is connected across these two pipes 12 and 13. The liquid level control unit preferably comprises a casing or receptacle 15 having a nipple 16 at the bottom thereof and a nipple 17 at the top thereof. The connection 18 serves to connect the bottom of the casing 15 with the lower pipe 13 and a connection 19 serves to connect the top of the casing with the upper pipe 12. By reason of these connections the liquid level in the receptacle 15 would correspond to the liquid level in the tank 3, the upper pipe of course enabling the same gas pressure to be maintained in the top of the casing 15 as is maintained in the top of the tank 3.

The casing 15, which may be cast of metal, is preferably provided with a removable side plate 15a which is sealed thereto, a gasket being indicated at 15b by means of which a fluid-tight seal is provided. At the same time the removal of the cover 15a affords access to the interior of the casing 15.

Provided in the bottom of the casing 15, preferably adjacent one corner thereof, is a lug 20 within which is a well 21 having a substantially concave bottom. A mercury tube switch 22 has a rounded end portion 23 which sets in this well. The mercury tube switch 22 is preferably formed of glass. The end 23 which is rounded to set into the well 21 is circular in cross section. The tube is preferably bent intermediate its ends and the free end portion 24, instead of being completely circular in cross section, is preferably of the cross section shown most clearly in Figure 3 wherein the bottom of the tube is shaped to provide a narrow trough or channel portion 24a. Within the glass tube 22 is a mass of mercury so that the end portion 23 of the tube is at all times filled with mercury and serves to keep this end of the tube seated in the well 21. The tube, however, is sufficiently large so that the tube as a whole is buoyant to the extent that the offset end portion 24 thereof will be buoyed or will float up and down as the liquid level in the casing 15 rises or falls. Fused through the free end of the tube 22 near the outermost portion thereof is a contact wire 26 which wire terminates in the trough 24a. A second wire 27 fused through the tube extends along the interior thereof and terminates in the mercury in the portion 23 of the tube. One wire 27 is thus always in contact with the mercury while the other contact 26 is immersed in the mercury only when the tube is in the full line position shown in Figure 2. When the tube is in the position shown in Figure 2, both wires 26 and 27 are in contact with the mercury so that a circuit may be closed through these two contacts. When the liquid level in the chamber 15 rises to a predetermined height causing the outer end of the tube 24 to slope upwardly as shown in dotted lines in Figure 2, the mercury will all run to the lower end of the tube and the contact 26 will no longer be immersed and the circuit will be broken. Flexible wires 26a and 27a are attached to the contacts 26 and 27 respectively. They preferably pass through a flexible ribbon of insulating material 28 to a connector designated generally as 29 that passes through the casing 15. Wires 26a and 27a together with the insulation 28 flex freely to allow the tube to move up and down as the liquid level changes, and the flat ribbon of insulation 28 keeps the ribbons from rubbing against one another and also restrains the tube from oscillating about a vertical axis in the casing.

The connector 29 to which the wires 26a and 27a are attached preferably comprises a shell 30 having a gas-tight body of insulating material 31 therein in which are embedded two binding posts, 33 and 34. One of the wires 26a is attached to the binding post 33 and the other is attached to the binding post 34. The shell 30 has a shoulder 35 thereon against which a gasket 36 is seated. The body is provided with an externally threaded extension 30a which passes through an opening in the casing 15. A nut 37 screwed onto the outside of the extension 30a serves to clamp the connector in the opening in the casing and compress the gasket 36 to make a gas-tight seal. Should it be necessary for any reason to replace the mercury tube and its connections, the nut 37 can be backed off, the plate 15a removed and the entire mercury tube and connector assembly removed from the casing and replaced by a similar unit. The casing may be provided with a drain plug 38 through which liquid may be drained from the casing should it be necessary.

In Figure 1 the size of the control unit in proportion to the size of the carbonator is considerably larger than actual installation would require and the control device has been shown enlarged in relation to the other parts for the purpose of clear illustration. Actually the casing 15 would be relatively smaller and the connections 18 and 19 would be relatively longer. By changing the length of the connections 18 and 19 the casing may be raised or lowered with respect to the tank 3 so as to change the level at which the circuit would be opened and closed.

In the particular illustration disclosed, one side of the motor 7 is connected through wire 40 directly to the source of power. The other side of the source of current is connected through wire 41 to one of the binding posts 33 or 34 and the other of these two binding posts is connected through wire 42 to the other side of the motor 7.

The operation of the invention of course will be apparent from the foregoing description. When the liquid level in the chamber 15 drops, the mercury tube which is buoyed by the liquid will swing downwardly until mercury will flow from the end portion 23 of the tube along the channel 24a to close the circuit. The closing of the circuit in the case of a carbonator will start the motor 7 and operate the pump to cause liquid to be forced into tank 3. As the liquid level rises, the free end 24 of the mercury tube will be buoyed up until the tube assumes the position where the mercury will all run back to the end 23 of the tube and thus open the circuit. The variation in liquid level permitted by the device will vary according to the shape of the tube and its buoyancy. One advantage of the reduced channel portion 24a in the bottom of the tube 24 is to permit a continuous body of mercury to extend along the portion 24a of the tube when this portion is in a horizontal or nearly horizontal position but the weight of this mercury will not be such as to overbalance the end 23 or allow the end 23 to lift out of the well. Because of the rounded end of the tube and the rounded well 21, the tube will rock freely in the well and it is unnecessary to provide any pivotal bearings or other parts which might become worn or which will stick due to corrosion or rust.

My invention provides a liquid level control device in which the buoyant element is the mercury switch itself and in which the only movable part needs to be the buoyant element. The contacts are completely protected within the mercury tube and it is unnecessary to have any movable part outside the carbonator or other vessel whose liquid level is to be controlled. It is unnecessary to provide the hose arrangement now commonly used and the various intricate mechanisms heretofore provided are entirely eliminated.

The modification shown in Figure 5 is essentially the same as the device shown in Figure 2 in that there is a buoyant mercury tube switch 22' having one end 22'' thereof received in a socket 23' so that the switch bulb may swing in a vertical arc within the enclosing casing 43. The casing has a connection 44 at the bottom thereof and another connection 45 at the top thereof by means of which pipes can be connected to both the bottom and top of the casing. The casing also has a drain plug 46 at the bottom thereof. The modification shown differs from the form previously described in connection with Figure 2 in that the flexible wires 47 and 48 leading from the connector plug 49 are connected with the glass tube 22' close to the heavy end thereof where the movement of the tube is less and therefore the wires have to flex to a lesser extent. Also, at this point the leverage is more effective for flexing the wires. The tube 22' may have, although it is not necessary, a slight protuberance 50 thereon integral therewith near the lower end of the tube and extending in a direction opposite the upper buoyant end of the tube. This projection serves to hold some of the mercury when the tube is in its uppermost position thus in part counterbalancing the weight of the buoyant end of the tube. When the tube is tilted down, the mercury flows out of this protuberance to the outer end of the tube. By reason of this arrangement the tube will tend to rock from one position to the other, the mercury flowing from one side of the center of balance to the other. This tends to hold the bulb in a position where the switch is definitely open or definitely closed and prevents the mercury from rapidly flowing back and forth to make and break current a number of times in each cycle of operation. In other words it prevents what might be termed "hunting" between the on and off positions.

Also in Figure 5 both contacts are at the buoyant end of the tube instead of one being at the buoyant end and one being permanently immersed in the mercury. This assures that the circuit will be closed when a small pool of mercury collects in the buoyant end of the tube, whereas when the tube is constructed as shown in Figure 2 there must be a continuous stream of mercury from the base of the tube to the tip. A still further modification shown in Figure 5 is the enlargement of the buoyant end of the tube to increase its buoyancy. The narrow trough corresponding to the trough 24a shown in Figure 3 is preferably retained in the bulb shown in Figure 5.

While I have illustrated and described one particular embodiment of my invention and one particular application thereof, it will be understood that various changes and modifications may be made therein and the invention may be used in connection with various types of apparatus wherein liquid levels are to be controlled and more especially those types of apparatus wherein the liquid level to be controlled is in a chamber subject to a pressure different from atmospheric pressure and wherein therefore the usual type of float valves cannot be employed.

I claim:

1. A liquid level control device comprising a chamber, a buoyant non-metallic vessel comprising mercury tube switch in the chamber supported to swing in an arc as the liquid level in the chamber changes, flexible wires attached to the mercury tube switch and a control circuit in which such a switch is included by means of said flexible wires.

2. A liquid level control device comprising a casing, a buoyant element in the casing having one end heavier than the other whereby one end is caused to rise and fall with a change in the liquid level in the casing, said buoyant element comprising a mercury tube switch, and flexible electric wires leading to said switch and permitting the movement thereof with the change in liquid level in the casing.

3. A liquid level control device comprising a casing, an element in the casing having angularly offset end portions with one end heavy and the other end buoyant whereby the element swings in a vertical arc as the liquid level changes in the casing, a mercury switch carried by said element, and flexible wires leading to the mercury switch.

4. A liquid level control device comprising a casing, a tubular element in the casing having a base portion and an angularly offset arm portion, means in the casing providing a socket for the reception of the base portion of said element, said element containing mercury, the mercury serving to keep the base portion in its socket while the angularly offset arm portion is buoyant whereby a tubular element swings in a vertical arc as the liquid level in the casing changes, contacts within the tubular element so disposed that a circuit between the contacts is closed when the offset arm portion swings downwardly beyond a predetermined position and opens when said offset portion swings upwardly beyond a predetermined position, and flexible connections leading to said contacts for permitting the free swinging movement of said element as the liquid level in the casing changes.

5. A liquid level control device comprising a casing, a tubular element in the casing having a base portion and an angularly offset arm portion, means in the casing providing a socket for the reception of the base portion of said element, said element containing mercury, the mercury serving to keep the base portion in its socket while the angularly offset arm portion is buoyant whereby a tubular element swings in a vertical arc as the liquid level in the casing changes, contacts within the tubular element so disposed that a circuit between the contacts is closed when the offset arm portion swings downwardly beyond a predetermined position and opens when said offset portion swings upwardly beyond a predetermined position, and flexible connections leading to said contacts for permitting the free swinging movement of said element as the liquid level in the casing changes, said offset arm portion of the tubular element having a reduced narrow channel portion formed therein along the bottom thereof in which the mercury flows from the base portion to the outer extremity of the arm portion.

6. A liquid level control device comprising a casing, a glass tube within the casing having angularly offset portions one of which constitutes a base portion and is rounded at the end, the other of which constitutes a buoyant portion, said casing having means therein providing a socket for the base portion of the tube, a mass of mercury in the tube, contacts passing through the tube and so disposed that when the tube is in one position the mercury closes a circuit between the contacts and when the tube is in another position the mercury opens the circuit between the contacts, and flexible wires leading to said contacts to permit the buoyant portions of said arm to swing up and down as the liquid level in the casing changes.

7. A liquid level control device comprising a fluid-tight chamber having fluid inlet and outlet ports at both the bottom and top thereof, an element in the casing having one end heavy and the other end buoyant whereby the element swings in a vertical arc as the liquid level changes, a mercury switch carried by said element, flexible wires leading to the mercury switch and permitting the movement of the element, and connector means passing through the wall of the casing and being fluid-tight in the casing to which the wires are connected whereby said device may be coupled into a fluid system in which pressures other than atmospheric pressure are maintained.

8. A buoyant mercury tube switch comprising a tubular body curved intermediate its ends, one end constituting a well to receive mercury and the other end comprising a float, a body of mercury in the tube insufficient to completely fill the tube, contacts within the tube so positioned that the mercury closes a circuit between them when the buoyant end of the tube is sloped downwardly with reference to a horizontal plane, and the circuit is opened when the buoyant end of the tube is sloped upwardly with reference to a horizontal plane.

9. A buoyant mercury tube switch comprising a tubular body curved intermediate its ends, one end constituting a well to receive mercury and the other end comprising a float, a body of mercury in the tube insufficient to completely fill the tube, contacts within the tube so positioned that the mercury closes a circuit between them when the buoyant end of the tube is sloped downwardly with reference to a horizontal plane, and the circuit is opened when the buoyant end of the tube is sloped upwardly with reference to a horizontal plane, said tube also having a protuberance thereon extending in a direction opposite to said buoyant end portion into which the mercury flows when the buoyant end of the tube is sloped upwardly and from which the mercury flows when the buoyant end of the tube is sloped downwardly to close the circuit to said contacts.

10. A liquid level control device comprising a fluid-tight chamber having ports at the top and bottom thereof, an element in the casing having one end heavy and the other end buoyant whereby the element swings in a vertical arc as the liquid level changes, said element comprising a mercury tube switch with a mass of mercury therein, said switch being so shaped that the mercury in part counterbalances the buoyant end in one position of said switch and flows into the buoyant end in the other position of said switch, contacts in the buoyant end of the mercury tube switch, and flexible wires leading to said contacts.

BERNARD J. INGRAM.